UNITED STATES PATENT OFFICE.

WILHELM GRÜNE, SR., OF BERLIN, GERMANY.

TRANSPARENT TOY OR PUZZLE-PICTURE AND MODE OF PRODUCING THE SAME.

SPECIFICATION forming part of Letters Patent No. 481,023, dated August 16, 1892.

Application filed March 14, 1892. Serial No. 424,882. (No specimens.)

*To all whom it may concern:*

Be it known that I, WILHELM GRÜNE, Sr., a subject of the Emperor of Germany, residing at the city of Berlin, in the Kingdom of Prussia, have invented certain new and useful Improvements in Transparent Toys or Puzzle-Pictures and in the Mode of Producing the Same, of which the following is a specification.

The principal objects of the present invention are, first, to provide a simple, expeditious, and comparatively inexpensive method of producing pictures, writings, or images upon glass in such manner that the pictures, writings, or images are visible only when the glass is breathed upon or otherwise subjected to the action of moist vapor, and, second, to produce an improved toy puzzle or article of manufacture comprising interesting and amusing transformation or double vapor-controlled apparition and occultation pictures.

A glass article provided with a vapor-controlled apparition and occultation picture may be produced according to my improved method in the following manner: One of the surfaces of a pane or sheet of glass is first well cleaned and dried and the required writings, pictures, or images are then drawn, written, painted, or otherwise produced on the same by means of varnish or any other protecting substance that is not acted upon by magnesium silicates and that may be readily washed or otherwise removed from the glass when required. After the protecting material has become dry the surface of the pane or plate is rubbed with finely-powdered silicate of magnesium, with the result that the whole surface of the glass, except those portions thereof that are protected by the picture, image, or writing, is covered with a peculiar kind of etching that cannot be discerned when dry, but is rendered visible upon the application of moisture thereto. The protecting material comprising the writing, picture, or image is then removed by washing the plate with water or other solvent, such as benzine, turpentine, and the like.

When a plate treated in the manner hereinbefore described is breathed upon or otherwise subjected to moisture, a transparent picture, image, or writing appears upon a dull ground, and this picture, image, or writing disappears from view as soon as the moisture has evaporated from the plate. However, it may be remarked that moisture in fact attacks and renders the etched portions of the plate or ground of the picture visible and does not in anywise affect the lines of the picture, image, or writing itself.

An exceedingly interesting and amusing transformation vapor-controlled apparition and occultation picture embodying features of my invention may be produced in the following manner: Two similar glass plates are treated in the hereinabove-described manner and so that when subjected to moisture one of them presents one image—for example, a picture of a cow—and the other presents a different image—for example, the picture of a woman. The picture on one of these plates—for example, the picture of the cow—is rendered visible by breathing upon or otherwise moistening the plate, whereupon the two plates are superposed with their prepared faces next to each other and may be secured in such position by means of clips or rubber bands or in any preferred manner, so that the image—in this case the picture of a cow—remains visible for a considerable length of time. If the back of the plate which presents the picture of a cow be now gently warmed, either by laying it upon the hand or by gently rubbing it, the moisture is evaporated and attaching the other plate renders the picture of the woman visible, so that double or transformation pictures are produced.

Having thus described the nature and objects of my present invention, what I claim as new, and desire to secure by Letters Patent, is—

1. The method of making transparent toys or puzzle-pictures, which consists in producing the picture upon the article by means of a protecting substance or material, as varnish, then etching the unprotected parts of the article by means of powdered silicate of magnesium, and then removing the protecting material from the article by means of a solvent, as benzine, substantially as and for the purposes set forth.

2. A transparent toy or puzzle-picture consisting of two similar glass plates adapted to be maintained in contact with each other and provided upon their adjacent faces with different vapor-controlled apparition and occultation pictures, the construction being such that by the application of heat to one plate and consequent deposition on the other the second picture is rendered visible, substantially as set forth.

In witness whereof I have hereunto set my hand in presence of two witnesses.

WILHELM GRÜNE, Sen.

Witnesses:
PAUL FISCHER,
ALBERT FLÖRICKE.